Figure 6:
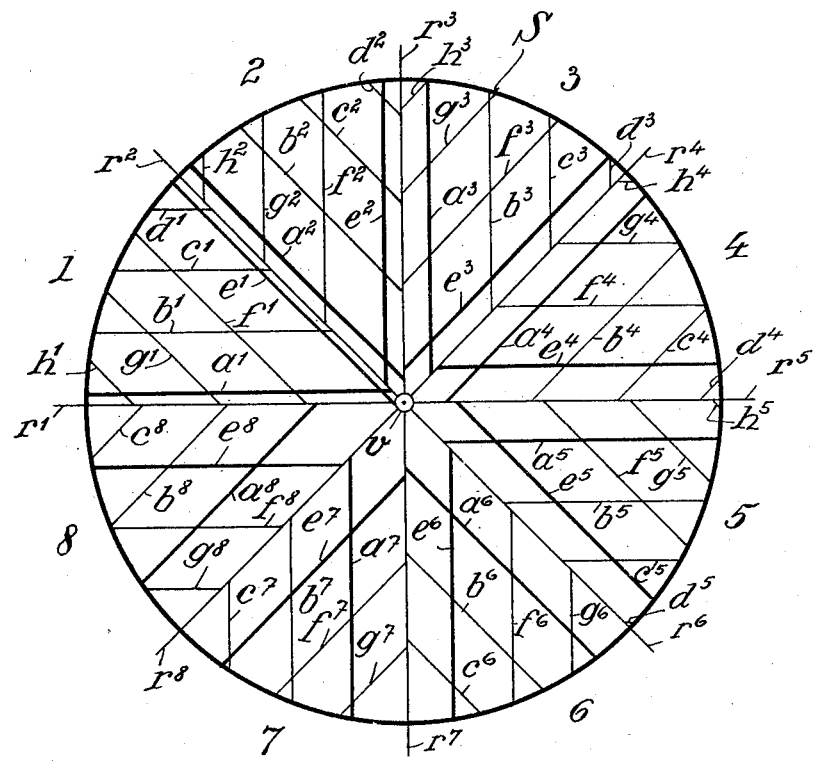

Dec. 6, 1932.   W. BAUERMEISTER   1,890,360
ROTARY SHUTTER FOR RÖNTGEN APPARATUS
Filed Dec. 11, 1928   2 Sheets-Sheet 1
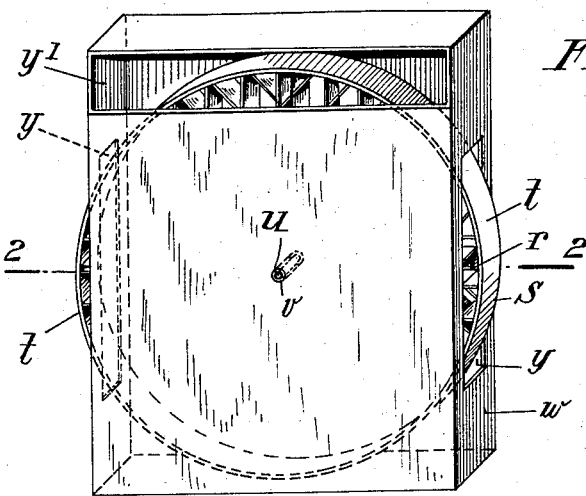
Fig. 1.
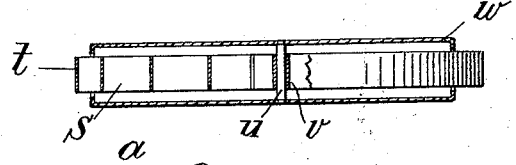
Fig. 2.
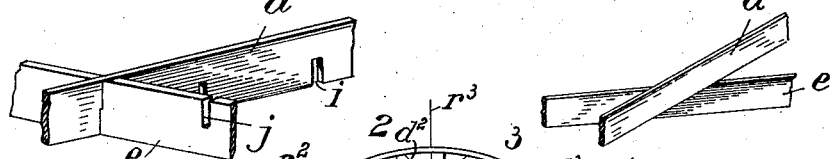
Fig. 3.
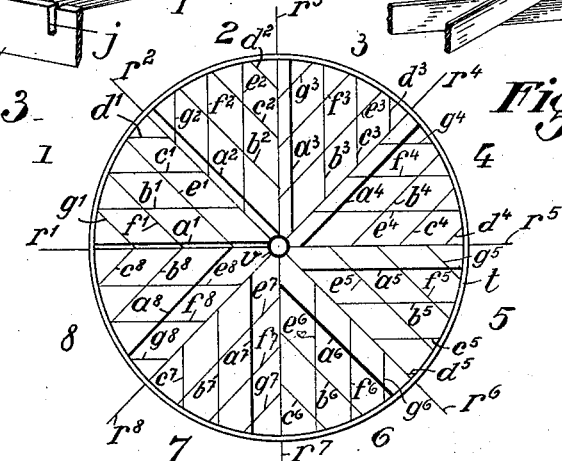
Fig. 4.
Fig. 5.
Inventor:
W. Bauermeister
By: Marks & Clerk
Attys.

Dec. 6, 1932.   W. BAUERMEISTER   1,890,360
ROTARY SHUTTER FOR RÖNTGEN APPARATUS
Filed Dec. 11, 1928    2 Sheets-Sheet 2

Inventor:
W. Bauermeister

Patented Dec. 6, 1932

1,890,360

UNITED STATES PATENT OFFICE

WILHELM BAUERMEISTER, OF BRUNSWICK, GERMANY

ROTARY SHUTTER FOR RÖNTGEN APPARATUS

Application filed December 11, 1928, Serial No. 325,254, and in Germany March 2, 1927.

My invention relates to improvements in shutters for Röntgen apparatus, and more particularly in shutters which are placed between an object and a screen or sensitized plate on which the object is to be projected by means of the Röntgen rays. More particularly my invention relates to rotary shutters which are provided for intercepting secondary Röntgen rays emitted by the action of the primary rays emitted from the Röntgen tube by the object to be projected, the said secondary rays tending to produce unsharp projections or images on the screen or sensitized plate. The object of the improvements is to provide a rotary shutter of the class referred to by means of which the action of the rays is practically not interfered with, and more particularly annular shades are not produced in the image, and the time of the exposure of the sensitized plate is not materially increased. Another object of the improvements is to provide a rotary shutter which is simple in construction and effective in operation, and which can be manufactured at low cost. With these and other objects in view one of the features of my improved shutter consists in disposing the transverse laminations forming parts of the shutter so that the number of the points of intersection of the laminations disposed equal distances away from the axis of the shutter and moving on equal circles is reduced.

For the purpose of explaining the invention two examples embodying the same have been shown in the accompanying drawings in which the same reference characters have been used in all the views to indicate corresponding parts. In said drawings, Fig. 1 is a perspective view showing the shutter and a casing carrying the same, Fig. 2 is a sectional plan view taken on the line 2—2 of Fig. 1, Fig. 3 is a detail perspective view showing a part of the shutter at a point of intersection of two laminations, Fig. 4 is a similar perspective view showing a modification, Fig. 5 is a diagrammatical top plan view showing the shutter and the relative position of the laminations thereof, and Fig. 6 is a similar top plan view showing a modification.

In the example shown in the drawings the shutter is in the form of a circular member S comprising a circular rim $t$, an axial sleeve $v$ and radial arms $r^1$, $r^2$ ... $r^8$ connecting the rim and the sleeve and disposed in the manner of the spokes of a wheel, the said member being adapted to be rotatably supported with its sleeve or hub $v$ on a shaft. The sectors provided by the radial arms are subdivided by sets of crossing laminations into compartments, the laminations $a$, $b$, $c$, $d$, $e$, $f$, $g$ of each set being respectively parallel to the radial arms $r^1$ to $r^8$. All the laminations are made from a material impermeable to Röntgen rays, and they are disposed within the shutter so that they are adapted to intercept all the rays disposed angularly of the primary rays emitted from the anode of the Röntgen tube and substantially parallel to the axis of the shutter. Thus the laminations are disposed with their planes parallel or substantially parallel to the axis of the member S.

The shutter is mounted within a box $w$ made from a material permeable to Röntgen rays, and it is mounted with its sleeve $v$ rotatable on an axis $u$ fixed to said box. Two side walls of the box $w$ are formed with longitudinal slots $y$, and the shutter S projects through said slots outwardly so that it can be engaged by the hand of the attendant for being rotated thereby. For the same purpose one of the end walls of the box is formed with an opening $y^1$ extending substantially the whole breadth of the box, and the shutter S is likewise accessible through the said opening $y^1$ for being rotated by the hand of the attendant. By thus having the shutter accessible from different sides of the box the shutter is easily accessible for being rotated in any position of the box. In some cases I provide similar slots or openings at other parts of the box. In the operation of the apparatus an impulse is given to the shutter by the finger of the attendant, whereupon it rotates by its inertia for a certain length of time sufficient for taking a photograph or observing the image projected on the screen. If necessary another impulse may be given to the shutter by the hand of the attendant for permitting inspection of the image for a long time.

As is known to those skilled in the art, by rotating the shutter the radial arms are prevented from producing shades on the image. The arms and the rim may be disposed perpendicularly to the end face of the shutter, or they may be slightly inclined relatively thereto according to the divergence of the Röntgen rays. When thus disposing the arms and the rim the shades produced thereby when using the shutter without rotating the same are equal only to the thickness of the arms, and when rotating the shutter the reduction of the light intensity is comparatively small.

At the points of intersection the laminations may be made with transverse cuts $i, j$ extending substantially to the middle of each lamination, and each adapted to receive a crossing lamination, so that the said laminations are interlinked, as is shown in Fig. 3. In Fig. 4 I have shown a modification in which the sets of laminations are placed one behind the other in axial direction. Other modifications will readily suggest themselves to those skilled in the art.

In the example shown in the figures the distances between adjacent laminations of the sets are equal. If now the distance between the radial arms and the adjacent lamination disposed parallel thereto is equal in all the sectors, the said sectors are subdivided in the same way, and corresponding points of intersection of the laminations are disposed on the same circle, so that in the operation of the apparatus circular shades are produced in the image by the rotation of the shutter. Therefore, in order to obviate this objectionable feature as far as possible, I dispose the laminations so that the number of the points of intersection of the laminations located on the same circles is reduced. With this object in view I dispose the first laminations in the sectors different distances away from the radial arms, so that corresponding parts of intersection are displaced with relation to each other in radial direction, and all the points of intersection are distributed on a comparatively large number of different circles.

In the construction shown in Fig. 5 the shutter S is divided by eight radial arms $r^1$ to $r^8$ into eight sectors of equal dimension, and in the first sector 1 the distance between the first lamination $a^1$ and the adjacent arm $r^1$ is equal to one eighth of the normal distance between the following laminations $b^1$, $c^1$ and $d^1$, while the distance between the first lamination $e^1$ of the set $e^1$, $f^1$, $g^1$ intersecting the laminations $a^1$, $b^1$, $c^1$, $d^1$ and the adjacent arm $r^2$ equal to the distance between the said laminations. In the sector 2 the distance between the lamination $a^2$ and the adjacent radial arm $r^2$ is the double of that of the distance between $a^1$ and $r^1$, that is two eighths of the normal distance between the laminations, and the distances between the other laminations $a^2$, $b^2$, $c^2$ and $d^2$ of the set are equal, while the distances between the arm $r^3$ and the laminations $e^2$, $f^2$ and $g^2$ are alike. In a similar way the distances between the first laminations $a^3$, $a^4$ etc. and the adjacent arms $r^3$, $r^4$ are successively increased to three eighths, four eighths, etc., the distance between $a^8$ and $r^8$ in the sector 8 being equal to the normal distance between the laminations.

By thus shifting one of the sets of parallel laminations in the successive sectors, the points of intersection are gradually shifted outwardly on the lines $r, e, f, g$, so that they are located in the sectors on different circles.

In the construction shown in Fig. 5 the points of intersection of the laminations $e$, $f, g$ of the different sectors with the radial arms $r$ are located on the same circles. In Fig. 6 I have shown a modification in which also these points of intersection are disposed with relation to one another in radial direction, the laminations $e, f, g, h$ being shifted relatively to the arms parallel thereto in the same way as the laminations $a, b, c, d$. As shown in Fig. 6, the distances between the first laminations $a^1$ and $e^1$, $a^2$ and $e^2$, etc. and the adjacent arms $r^1$ and $r^2$, $r^2$ and $r^3$, etc. are successively increased in the sectors by one sixteenth of the normal distance between the laminations. Thus in sector 1 the distance between lamination $a^1$ and arm $r^1$ is one sixteenth of the normal distance between the laminations, and the distance between lamination $e^1$ and the adjacent arm $r^2$ is two sixteenths, in sector 2 the distance between lamination $a^2$ and arm $r^2$ is three sixteenths, and the distance between $e^2$ and arm $r^3$ is four sixteenths, etc., the distance between lamination $a^8$ and $r^8$ being fifteen sixteenths, and the distance between $e^8$ and $r^1$ being sixteen sixteenths of the normal distance between the laminations.

The sectors divided in the manner described above may be exchanged among one another without changing the result, because the distribution of the circles intersecting the different points of intersection remains the same with any sequence of the sectors. Thus for example when separately manufacturing the individual sectors, the said sectors can be combined into a shutter in different ways.

While in describing the invention reference has been made to particular examples embodying the same I wish it to be understood that my invention is not limited to the constructions shown in the drawings, and that various changes may be made in the general arrangement of the apparatus and the construction of its parts without departing from the invention.

I claim:

1. A shutter for intercepting secondary Röntgen rays, comprising a member adapted to be rotatably mounted in the path of the Röntgen rays and comprising radial arms dividing the member into sectors, and sets of crossing laminations in each of the sectors disposed respectively parallel to the radial arms bounding the sectors and disposed equal distances apart, the laminations being disposed with their planes substantially in the direction of the rays and consisting of a material impermeable to Röntgen rays, and the distance between the first lamination of each set and its adjacent radial arm being different in different sectors.

2. A shutter for intercepting secondary Röntgen rays, comprising a member adapted to be rotatably mounted in the path of the Röntgen rays and comprising radial arms dividing the member into sectors, and two intercrossing sets of crossing laminations in each of the sectors disposed respectively parallel to the radial arms bounding the sectors and disposed equal normal distances apart, the laminations being disposed with their planes substantially in the direction of the rays and consisting of a material impermeable to Röntgen rays, and the distances between the first laminations of corresponding sets of laminations and the adjacent arms being different multiples in the different sectors of the fraction of the normal distance between the laminations obtained by dividing the said normal distance by the number of the sectors.

3. A shutter for intercepting secondary Röntgen rays, comprising a member adapted to be rotatably mounted in the path of the Röntgen rays and comprising radial arms dividing the member into sectors, and sets of crossing laminations in each of the sectors disposed respectively parallel to the radial arms bounding the sectors and disposed equal normal distances apart, the laminations being disposed with their planes substantially in the direction of the rays and consisting of a material impermeable to Röntgen rays, the distance between the first lamination of the first set of parallel laminations and its adjacent arm being equal in the different sectors to different multiples of the fraction obtained by dividing the normal distance between the laminations by the number of the sectors, and the distance between the first lamination of the other set and its adjacent arm being different from the said distance between the first lamination of the first set and its adjacent arm by one half of the said fraction.

4. A shutter for intercepting secondary Röntgen rays, comprising a member adapted to be rotatably mounted in the path of Röntgen rays and comprising radial arms dividing the member into sectors, and sets of crossing laminations in each of the sectors disposed respectively parallel to the radial arms bounding the sectors and disposed equal normal distances apart, the laminations being disposed with their planes substantially in the direction of the rays and consisting of a material impermeable to Röntgen rays, and the distance between the first lamination of one set and its adjacent radial arm gradually increasing in the successive sectors according to multiples of a fraction of the normal distance between the laminations obtained by dividing the said distance by the number of the arms.

In testimony whereof I affix my signature.

WILHELM BAUERMEISTER.